United States Patent [11] 3,624,275

[72] Inventor Gerald K. Lunn
Scottsdale, Ariz.
[21] Appl. No. 873,839
[22] Filed Nov. 4, 1969
[45] Patented Nov. 30, 1971
[73] Assignee Motorola, Inc.
Franklin Park, Ill.

[54] COLOR TELEVISION SIGNAL DEMODULATION SYSTEM WITH COMPENSATION FOR HIGH-FREQUENCY ROLLOFF IN THE LUMINANCE SIGNAL
7 Claims, 2 Drawing Figs.

[52] U.S. Cl. 178/5.4 MA, 178/5.4 SD
[51] Int. Cl. H04n 9/50
[50] Field of Search 178/5.4 SD, 5.4 MA

[56] References Cited
UNITED STATES PATENTS

| | | | |
|---|---|---|---|
| 3,446,915 | 5/1969 | Voige | 178/7.5 E |
| 3,506,776 | 4/1970 | Rennick | 178/5.4 SD |

OTHER REFERENCES
"Color TV Processing Using Integrated Circuits," pp. 54–59, Nov. 1966, Biaser and Bray
"Integrated Circuits for Television Receivers," May 1969, Sugata and Namekawa

*Primary Examiner*—Robert L. Richardson
*Assistant Examiner*—Donald E. Stout
*Attorney*—Mueller, Aichele & Rauner

ABSTRACT: A silicon monolithic integrated circuit consisting of two sets of full-wave synchronous gated transistor demodulators is used to demodulate the red and blue color difference signals present in a composite television signal. Selected outputs of these demodulators are matrixed to provide the green color difference signal. The color difference signals are applied to the bases of emitter-follower output amplifiers which also are supplied with the brightness signals from an additional emitter-follower luminance amplifier, the output of which is coupled to the bases of the emitter-follower output amplifiers through coupling capacitors, which compensate for most of the high-frequency rolloff in the brightness signals and further provide filtering of carrier harmonics from the detected color reference signals. Collector current for the switching transistors in the demodulators is obtained from the emitter of the emitter-follower luminance amplifier, so that blanking may be accomplished by rendering the luminance amplifier nonconductive during the blanking intervals.

INVENTOR.
GERALD K. LUNN
BY Mueller, Aichele & Rauner
ATTORNEYS.

INVENTOR.
GERALD K. LUNN
BY. Mueller, Aichele & Rauner
ATTORNEYS.

COLOR TELEVISION SIGNAL DEMODULATION SYSTEM WITH COMPENSATION FOR HIGH-FREQUENCY ROLLOFF IN THE LUMINANCE SIGNAL

BACKGROUND OF THE INVENTION

In the manufacture of electronic devices such as television receivers, it is desirable to utilize solid-state components to the greatest extent possible in order to realize the advantages inherent in such components. One of the circuits in a color television receiver requiring a relatively large number of components is the color demodulator section of the receiver. This portion of the television receiver is used to separate the color difference signals present in the NTSC color television signal. This signal includes a wide-band brightness or luminance (Y) signal, and a modulated subcarrier signal of approximately 3.58 MHz. The subcarrier signal is phase and amplitude modulated by color difference signals (R–Y, B–Y and G–Y), so that different phases of the subcarrier each represent the hue of an image portion and the subcarrier amplitude at that phase represents the saturation of that hue. A monochrome receiver visibly reproduces only the Y component.

Recently, an integrated circuit synchronous demodulator has been developed for producing the desired color difference signals, which then are combined with the luminance signals to produce the desired red, green and blue color signals to be reproduced by the cathode ray tube of the television receiver. The output of this demodulator, however, must be filtered in order to eliminate carrier harmonics which are produced in the color difference signals by the demodulation process.

It is desirably to provide an integrated circuit color demodulator which produces directly the red, green and blue output signals, and which does not require additional filter stages at the outputs of the demodulator.

SUMMARY OF THE INVENTION

Accordingly, it is an object of this invention to provide an improved synchronous color demodulator.

An additional object of this invention is to provide an integrated circuit demodulator for directly producing a color representative signal. A further object of the invention is to mix the correct amount of the luminance portion of a color television signal with the color difference signal produced in an integrated circuit synchronous demodulator to produce the red, green and blue outputs directly from the integrated circuit.

In a preferred embodiment of this invention a plurality of individual synchronous gated full-wave demodulators produce color difference signals under the control of a color reference signals having phases associated with particular colors. Two pairs of switching devices are provided in each demodulator and switching devices of difference pairs in the same demodulator have common-connected outputs and are rendered alternately conductive. An output signal produced by each of the demodulators is supplied to a corresponding transistor-amplifier means. An additional luminance amplifier means is supplied with the brightness signal components of the composite television signal, and the output of the luminance amplifier also is supplied to the transistor amplifier means associated with each of the demodulators, so that the outputs of the transistor amplifier means constitute directly demodulated color signals. The coupling between the output of the luminance amplifier and the transistor amplifier means for each of the demodulators is a capacitor means for bypassing the high frequency luminance components and further operating to filter the carrier harmonics produced in the operation of the demodulators.

In its preferred form, the color demodulator, including the luminance amplifier, the transistor amplifier means and the capacitive coupling means for coupling the output of the luminance amplifier to the inputs of the transistor amplifier means all are formed on the same integrated circuit chip.

DETAILED DESCRIPTION

Figure 1:
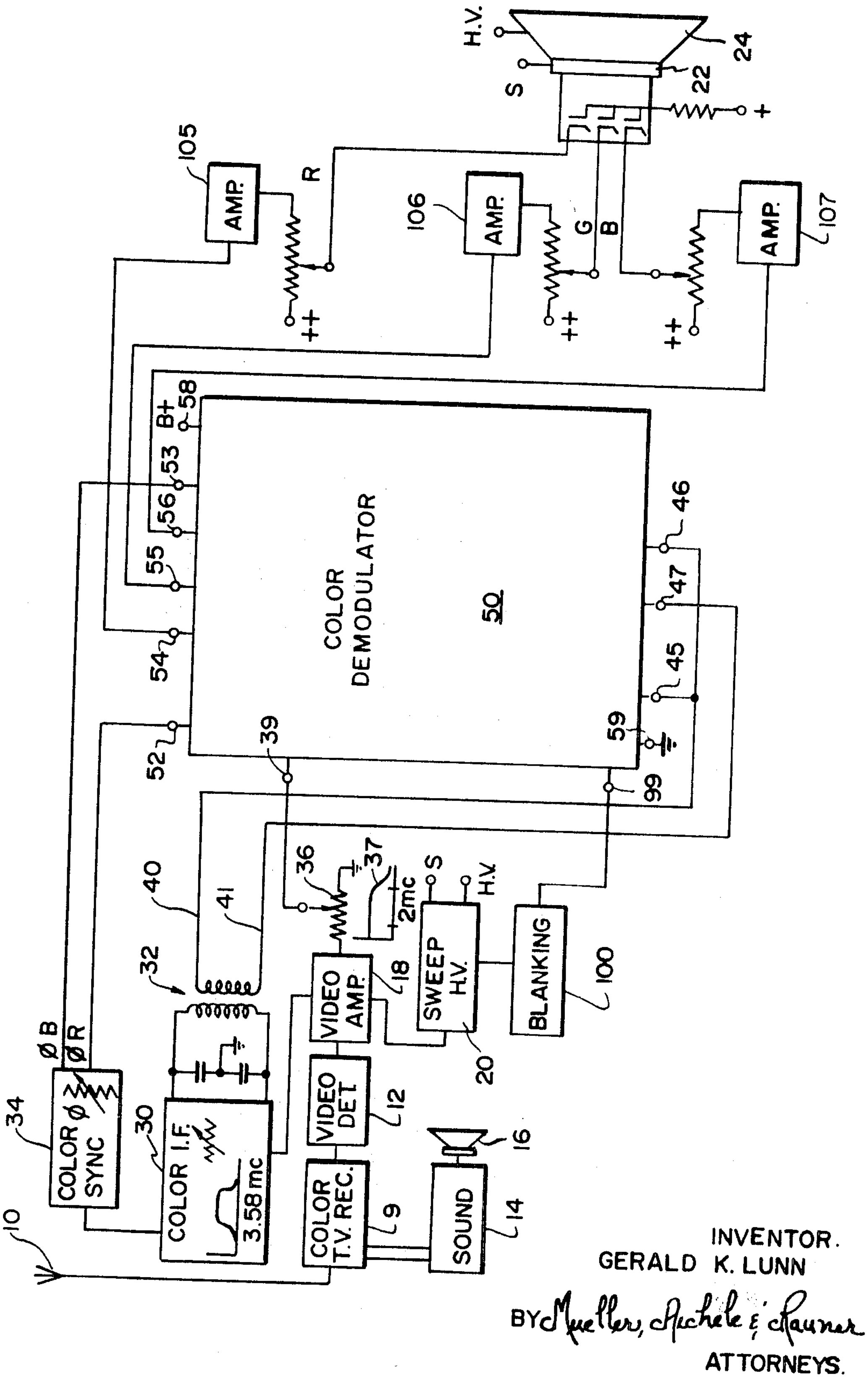
FIG. 1 is a block diagram of a television receiver incorporating a color demodulator in accordance with a preferred embodiment of the invention.

Referring now to the drawing, a color television receiver 9 is coupled to a suitable antenna 10 to receive a signal and to select, amplify and convert this signal to IF frequency for application to a video detector 12. In addition, the color receiver circuit 9 also is coupled to a sound system 14 which demodulated and amplifies the usual 4.5 MHz. sound subcarrier to drive a speaker 16.

The video detector 12 is coupled to a video amplifier 18 having outputs to the various remaining stages of the receiver. The horizontal and vertical beam synchronizing pulses of the video signal are selected by a sweep and high voltage system 20 which has an output (S) coupled to the deflection yoke 22 on the neck of a three-beam cathode ray tube 24. The system 20 also provides a high voltage output (H.V.) for the screen of the shadow mask of the cathode ray tube 24. The video amplifier 18 further is coupled to a color subcarrier IF amplifier 30 which includes band-pass filter networks for selecting the color subcarrier at 3.58 MHz. and its associated sidebands. The amplifier 30 includes a gain or color intensity control to furnish a selected amplitude of the chroma subcarrier signal of opposite phases with respect to ground at the primary winding of a transformer 32.

In addition, the color IF amplifier 30 is further coupled to a color synchronizing oscillator 34, which selects the burst signals appearing on the "back porch" of the horizontal synchronizing pulses in order to develop a color reference signal of 3.58 MHz. for sychronous demodulation of the color signals. The oscillator 34 has a control for shifting the phases of the two different output signals produced, thereby shifting the demodulation angle slightly and affording a color shift in the reproduced image.

The video amplifier 18 also includes a variably contrast control 36., across a selected portion of which the wide band composite signal is developed with respect to ground, with this signal being applied to a brightness input bonding pad 39 of an integrated circuit color demodulator 50 where it is combined with the color difference signals produced in the demodulator to form the desired red, green and blue color signals at the outputs of demodulator circuit 50. The luminance or brightness signal available at the tap of the control 36 may extend in frequency range 37 up to or into the chroma subcarrier side bands.

The secondary winding of the transformer 32 has a pair of output leads 40 and 41, with the lead 40 carrying the modulated chroma subcarrier of one phase and the lead 41 carrying the modulated chrome subcarrier of opposite phase. The lead 40 is coupled to input bonding pads 45 and 46 on the demodulator integrated circuit 50 and the lead 41 is coupled to a bonding pad 47. In order to demodulate the signals obtained from the secondary winding of the transformer 32 and applied over the leads 40 and 41 to the demodulator circuit 50, the two phases of reference oscillator signal for demodulating the red and blue color difference signals are applied to the bonding pads 52 and 53, respectively, of the demodulator 50 which includes a pair of demodulator circuits for demodulating the red and blue color difference signals. Also included in the demodulator circuit 50 is a matrixing circuit coupled to the outputs of the red and blue demodulator circuits for producing the green difference signals.

As stated previously, the luminance or brightness components are applied to the demodulator circuit 50 on the bonding pad 39, and the operation of the demodulator circuit in such as to produce directly the red, green and blue color signals on three output bonding pads 54, 55 and 56. These output bonding pads are connected to three video output amplifiers 105, 106 and 107, at the outputs of which the video signals representing the amplifier red, green and blue color components are developed. Each of the amplifiers 105, 106 and 107 includes variable variable resistor coupled to a different cathode of the three-beam cathode ray tube 24, with the cathodes being part of the red, green and blue electron guns in the tube 24. Associated grids of these cathodes are coupled to a suitable bias source, and the tube 24 operates in accordance with known shadow mask principles to reproduce a monochrome or full-color image in accordance with the video drive signals applied to it.

In the receiver generally described thus far, there may be further circuitry which is known but which has not been disclosed in detail in order to simplify this disclosure. For example, there can be a gated automatic gain control system, a color killer system for interrupting the amplifier 30 in the absence of the color signal, as well as other circuitry now known in commercially produced color television receivers. It should further be noted that it is preferably for the video detector 12 to be direct current coupled through all of the succeeding amplifiers and demodulators directly to the cathodes of the picture tube 24 in order to maintain constant the DC component of the signals processed in the various translation paths.

Figure 2:
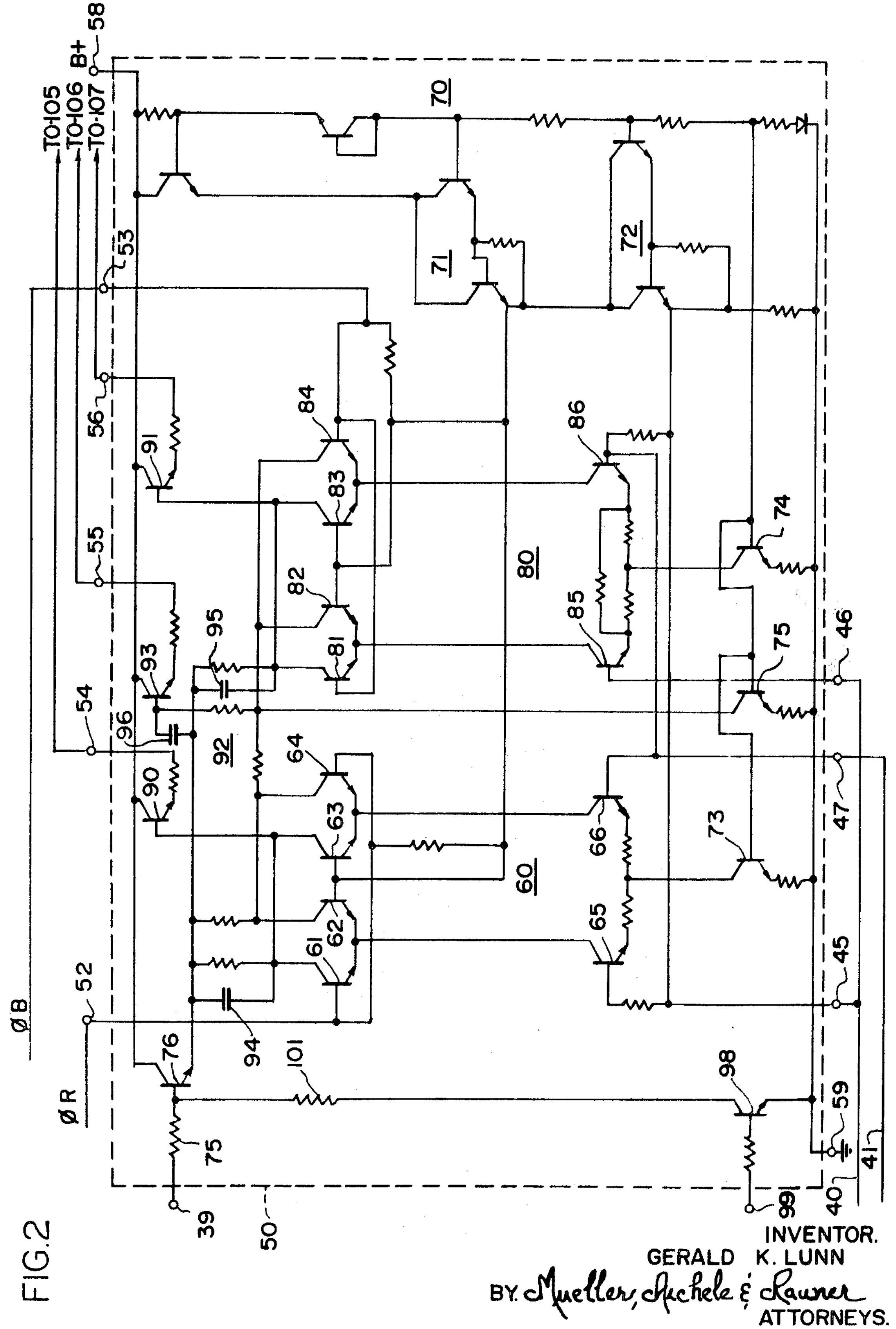
FIG. 2 is a detailed schematic diagram of the color demodulator circuit shown in FIG. 1.

Referring now to FIG. 2 where the integrated circuit demodulator 50 is shown in detail, it may be seen that two gated synchronous full-wave demodulators 60 and 80 are provided, and these demodulators are substantially the same. The demodulator 60 includes two pairs of NPN switching transistors 61, 62 and 63, 64, and two input transistors 65 and 66. Similarly numbered switching transistors and input transistors are found in the demodulator 80; and for the purposes of explaining the operation of the demodulators, the description is limited to the demodulator 60. It should be understood, however, that the description of the operation of the demodulator 60 applies equally as well to the operation of the demodulator 80.

The transistors 61 and 62 are differentially connected, with the emitters connected in common to the collector of the input transistor 65. Similarly, the transistors 63 and 64 are differentially connected, with their emitters connected in common to the collector of a second input transistor 66. The color reference signal corresponding to the phase of the red color signal and applied to the bonding pad 52 is applied to the bases of the transistors 61 and 64.

The bases of the transistors 62 and 63 are connected in common and are supplied with a constant DC bias potential. This potential is obtained from a voltage divider 70 which is connected between a bonding pad 58, having B+ potential applied to it, and a bonding pad 59 connected to ground. All of the DC bias potentials for the operation of the demodulator circuit 50 are obtained from this voltage divider 70, and the bias potential applied to the bases of the transistors 62, 63 is obtained from a circuit 71 including a cascaded pair of NPN-transistors. As a consequence, a low-impedance reference voltage for controlling the switching level of the differential amplifier pairs 61, 62 and 63, 64 is established from the voltage divider.

The operating current level for the differentially connected input transistors 65, 66 and 85, 86 is obtained from a second cascaded pair of transistors 72. A transistor 73 is operated as a constant current source for the differentially connected transistors 65, 66 in the demodulator 60 and a transistor 74 similarily operates as a constant current source for the differentially connected transistors 85, 86 in the demodulator circuit 80. Similarly a transistor 75 operates as a constant current source to draw additional current through the load resistors of the transistors 62, 64, 82 and 84, with the operating levels of the constant current transistors 73, 74 and 75 being obtained from a common tap on the voltage divider 70.

The brightness signal components supplied to the bonding pad 39 are coupled through a resistor 75 to the base of an NPN emitter-follower amplifier transistor 76, the collector of which is connected to the bonding pad 58 supplied with B+ potential. The emitter of the transistor 76 is connected through suitable collector-resistors to the collectors of the switching transistors 61, 62, 63 and 64 to provide the operating collector potential for these transistors.

The reference frequency signals obtained from the oscillator 34, on one-half cycle of the red reference signal, render the transistor 61 and 64 conductive, while at the same time causing the transistors 62 and 63 to be driven nonconductive; on the next half cycle of the reference signal the transistors 61 and 64 are driven nonconductive, while the transistors 62 and 63 are rendered conductive. This operation occurs for each cycle of operation of the signal obtained from the oscillator 34; so that the transistors 61, 62 and 64, 63 in each of the pairs of the switching circuits of the demodulator 60 are alternately rendered conductive.

The signal input transistor 65 is supplied with the modulated subcarrier signal of one phase appearing on the bonding pad 45, and the signal input transistor 66 is supplied with the opposite phase of the modulated subcarrier signal appearing on the bonding pad 47. Since the frequency of the signals obtained from the output of the oscillator 34 is chosen to be the same as the modulated color signal subcarrier, the modulators 60 and 80 are operated as gated synchronous demodulators. The alternate, symmetrical, synchronous gating of the two pairs of switching transistors 61, 62, 63 and 64 coupled to the collectors of the input transistors 65 and 66 provides a full-wave recovery of the modulated information at the output terminals of the cross-coupled collectors of the transistors 61, 63 and 62, 64; so that normal and inverted demodulated red color difference signals are available from the demodulator 60.

Since the output signals available from each of the two output terminals formed by the cross-coupled collectors of the transistors 61, 63 and 62, 64 are of opposite phase, the desired phase of output signal may be selected merely by choosing whichever of the two output terminals provides that desired phase. In the circuit shown in FIG. 2, the desired phase for the demodulated R–Y color difference signal is obtained from the cross-coupled collectors of the transistors 61 and 63, and is connected directly to the base of an NPN emitter-follower transistor amplifier 90. Similarly the desired output signal for the B–Y output is obtained from the cross-coupled collectors of the transistors 81 and 83 and is connected to the base of a similar NPN emitter-follower transistor amplifier 91.

In order to produce the G–Y color difference signal, selected amplitudes of the opposite phases of the outputs of the demodulators 60 and 80 are combined in a resistor matrix 92 and are applied to the base of a third NPN emitter-follower transistor amplifier 93. Since the values of the collector resistor for the G–Y component are normally must lower than the values used for the R–Y and B–Y components, the extra current drawn through the load resistors of the transistors 62, 64, 82 and 84 by the transistor 75 operates to equalize the DC voltage on the bases of the three output transistors 90, 91 and 93.

The transistor 76 could be used solely as a brightness control transistor by varying the DC level at the base thereof. This in turn would vary the potential applied to the collectors of the demodulator transistors 61–64 and 81–84 in the demodulators 60 and 80 to control the DC output levels of the three detected color difference signals appearing on the emitter of the transistors 90, 91 and 93 to vary the picture brightness level. With the demodulator circuit 50 used in this manner, it is necessary to provide for the combination of the brightness signal components with the demodulated color difference signals at some other point in the receiver. This can be done in the picture tube 24 by applying the color difference signals directly to the cathodes of the picture tube 24 and by applying the brightness signal components to the grids thereof. In order applications it may be desirable to provide for a matrixing or combination of the brightness signal components and the color difference signal components at a stage prior to the picture tube 24, causing only the desired color signals to be applied directly to the cathodes of the picture tube 24.

Using the transistor 76 as an emitter-follower to which the collector load resistors of the switching transistors 61 to 64 and 81 to 84 are returned, however, permits brightness signal components applied to the base of the transistor 76 to be directly combined with the outputs of the demodulator circuits. Since the collector impedances of the transistors 61 to 64 and 81 to 84 are high compared with the collector load resistors, any signal appearing at the emitter of the transistor 76 appears virtually unattenuated at the collectors of the transistors 61 to 64 and 81 to 84, and therefore at the inputs to the emitter-followers 90, 91 and 93. Thus it is possible to mix the correct amount of the brightness signal components of the color television signal with the color difference signals produced by the synchronous demodulator circuits 60 and 80 to produce the red, green and blue outputs directly from the integrated circuit 50.

In the circuit thus far described, a high frequency rolloff of the brightness luminance signal occurs due to the collector capacitances of the transistors 61 to 64 and 81 to 84, and due to the input capacitances of the emitter-follower transistors 90, 91 and 93. In addition, harmonics of the oscillator reference signal used to gate the synchronous demodulators 60 and 80 also appear at the outputs of the emitter-followers 90, 91 and 93 necessitating the use of additional filtering stages to eliminate these harmonic components.

In order to extend the bandwidth of the high frequency components of the luminance signal, which is otherwise restricted by the RC time constant of the load resistors and the capacitances of the collectors of the transistors 61 to 64 and 81 to 84 and the emitter-follower transistors 90, 91 and 93, three small capacitors 94, 95 and 96 are connected between the emitter of the transistor 76 76 and the bases of the three emitter-follower transistors 90, 91 and 93, respectively. These capacitors have a value of approximately 10 pF and bypass the high frequency components at the emitter of the transistor 76, thereby considerably extending the bandwidth of the signal obtained at the emitters of the transistors 90, 91 and 93. The capacitors 94, 95 and 96 also operate to filter out or remove the majority of the rectified carrier components which occur as a product of the chroma demodulation process in the demodulators 60 and 80. This enables an increase in the available swing before clipping of the composite luminance/color difference signal and reduces the high frequency components which must pass through the emitter-followers 90, 91 and 93 into the video output stages 105, 106 and 107. Since the input impedance of the video output stages tends to be very capacitive (greater than 100 pF), the loading on the emitter followers 90, 91 and 93 is such that to pass large high frequency components without distortion, the emitter-follower transistors must be run at a high quiescent current (normally greater than 5 mA). The filtering provided by the capacitors 94, 95 and 96 therefore reduces the quiescent current required in the emitter-followers 90, 91 and 93 and accordingly reduces the power dissipation in the integrated circuit chip 50.

Horizontal and vertical retrace blanking functions may be incorporated into the design of the integrated circuit demodulator 50 and this has been implemented in the circuit shown in FIG. 2 by providing a blanking transistor 98, the collector of which is connected through a resistor 101 to the base of the luminance amplifier transistor 76 and the emitter of which is connected to ground at the bonding pad 59. Blanking signals are obtained from the sweep circuit 20 and are indicated as being applied to a blanking output circuit 100 which supplies the blanking signals to a bonding pad 99 connected to the base of the NPN-transistor 98. During the retract operation of the sweep circuit 20, the positive blanking pulses applied to the base of the transistor 98 are of sufficient magnitude to drive the transistor 98 into saturation. When this occurs, the current diverted from the base of the transistor 76 through the resistor 101 to ground causes the base of the luminance amplifier 76 to become biased negatively with respect to its emitter, thereby rendering it nonconductive. This forces the potential on the emitter of the transistor 76 to be driven negatively, forcing all three detected outputs obtained from the emitters of the transistors 90, 91 and 93, respectively, to be driven negatively by the same amount. Thus, the desired blanking signal condition is obtained at the outputs of the emitter-followers 90, 91 and 93.

From the foregoing, it may be seen that an effective synchronous gated color demodulator circuit for direct demodulation of color and brightness components is provided by the integrated circuit 50 shown in the drawing. The circuit may be used to produce color difference signals at the outputs by utilizing the transistor 76 merely as a brightness control if it is desirable to use the demodulator circuit 50 in systems requiring color difference signals from the output of the demodulator. Because of the use of the coupling capacitors 94, 95 and 96 when the circuit is used as a direct demodulator, it is possible to eliminate the normally required additional filtering stages usually interposed between the demodulator circuit and the amplifiers 105, 106 and 107, while additionally permitting operation of the integrated circuit 50 at a lower current level, thereby reducing the power dissipation in the integrated circuit.

I claim:

1. A color television receiver for a signal comprising brightness signal components of a television image and a subcarrier signal modulated by color difference signals representing hue and saturation of the image at different phases of the subcarrier and having reference oscillator means providing reference signals at the subcarrier frequency and at different phases, said receiver including in combination;

a plurality of full-wave demodulators each including two pairs of switching devices, with the outputs of one pair of switching devices in each demodulator being coupled in common with different ones of the outputs of the other pair of switching devices in the same demodulator;

means for supplying the modulated subcarrier signal at opposite phases to the two pairs of switching devices in each of the demodulators;

means for supplying said reference signals at the subcarrier frequency and at different phases to the switching devices of the demodulators, with the common-connected switching devices of each demodulator being alternately rendered conductive at the subcarrier frequency for providing normal and inverted output signals representing a different color difference signal from each of the demodulators;

a plurality of transistor amplifier means each having an input electrode connected to receive one of the outputs from a different one of the demodulators;

luminance amplifier means;

means for supplying the brightness signal components to the luminance amplifier means; and plurality of capacitor means each having first and second terminals, the output of the luminance amplifier means connected with the first terminals of the capacitor means and the input electrodes of the transistor amplifier means each connected with the second terminal of a different capacitor means said capacitor means bypassing high frequency brightness components, extending the bandwidth of the signals obtained from the output of the transistor amplifier means.

2. A color television receiver for a composite signal comprising brightness signal components of a television image and a subcarrier signal modulated by color difference signals representing hue and saturation of the image at different phases of the subcarrier and having a reference oscillator means providing reference signals at the subcarrier frequency and at different phases, said receiver including in combination:

a plurality of full-wave demodulators each including two pairs of transistor switching devices, with the outputs of one pair of the transistor switching devices in each demodulator being coupled in common output with different ones of the outputs of the other pair of transistor switching devices in the same demodulator;

means for supplying the modulated subcarrier signal at opposite phases to the two pairs of switching devices in each of the demodulators;

means for supplying the reference signals at the subcarrier frequency and at different phases to the switching devices of the demodulators, with the common-connected transistor switching devices of each demodulator being alternately rendered conductive at the subcarrier frequency for providing normal and inverted output signals representing a different color difference signal from each of the demodulators;

a plurality of emitter-follower transistor amplifier means each having an input connected to one of the common outputs of different ones of the demodulators;

a transistor luminance amplifier;

means for supplying the brightness signal components to the input of the transistor luminance amplifier;

a plurality of capacitor means for coupling the output of the transistor luminance amplifier with the inputs of each of the emitter-follower amplifier means for adding the brightness signal components to the color difference signals at the inputs of the emitter-follower amplifier means, thereby causing the outputs of the emitter-follower amplifier means to be the desired color signals, the capacitor means operating to bypass the brightness signal components and further operating to substantially remove the rectified carrier component produced as a product of the demodulation process.

3. The combination according to claim 2 wherein the switching transistors in the full-wave demodulators each include collector, base and emitter-electrodes with the collector electrodes of the switching transistors being coupled through collector load resistors to the output of the transistor luminance amplifier.

4. The combination according to claim 3 wherein the emitter-follower transistor amplifier means each have collector, base and emitter-electrodes, with the collector electrodes of the switching transistors providing the outputs of the demodulators and being connected with the bases of the corresponding emitter-follower amplifiers for each demodulator, and further wherein the capacitor means coupling the output of the luminance amplifier means with the inputs of the emitter-follower amplifier means is connected between the output of the luminance amplifier means and the base electrodes of the respective emitter-follower transistor amplifier means.

5. The combination according to claim 4 wherein the luminance amplifier means is a transistor emitter-follower having base, collector and emitter-electrodes, with the collector electrode being coupled with a source of operating DC potential and with the luminance signals being applied to the base thereof, the emitter thereof being coupled through the capacitor means to the bases of the emitter-follower transistor amplifier means and through said collector load resistors to the collector electrodes of the transistor switching devices in the full-wave demodulators.

6. The combination according to claim 5 wherein at least the plurality of full-wave demodulators, the luminance amplifier means, and the emitter-follower transistor amplifier means, and the capacitor means all are formed on the same integrated circuit chip.

7. The combination according to claim 5 further including blanking means coupled with the input to the luminance amplifier means and rendered operative during blanking intervals of the received composite signal to render the luminance amplifier means nonconductive during the blanking intervals thereby removing the source of collector potential for the transistor switching devices in the demodulators, causing in turn the outputs of the emitter-follower transistor amplifier means all to drop by the same amount during the blanking interval.

* * * * *